(12) United States Patent
Liu

(10) Patent No.: US 11,518,149 B2
(45) Date of Patent: Dec. 6, 2022

(54) MULTILAYER PACKAGING MATERIALS WITH RELEASE OF MIGRATORY ACTIVE SUBSTANCES

(71) Applicant: Campbell Soup Company, Camden, NJ (US)

(72) Inventor: Hua Liu, Moorestown, NJ (US)

(73) Assignee: Campbell Soup Company, Camden, NJ (US)

( * ) Notice: Subject to any disclaimer, the term of this patent is extended or adjusted under 35 U.S.C. 154(b) by 8 days.

(21) Appl. No.: 16/682,117

(22) Filed: Nov. 13, 2019

(65) Prior Publication Data

US 2020/0189247 A1  Jun. 18, 2020

Related U.S. Application Data

(60) Provisional application No. 62/760,358, filed on Nov. 13, 2018.

(51) Int. Cl.
*B32B 27/08* (2006.01)
*B32B 27/18* (2006.01)

(52) U.S. Cl.
CPC .............. *B32B 27/08* (2013.01); *B32B 27/18* (2013.01); *B32B 2250/03* (2013.01);
(Continued)

(58) Field of Classification Search
CPC ........... B32B 2307/74; B32B 2439/70; B32B 27/08; B32B 27/18; B32B 2250/03; B32B 2274/00; B32B 2307/71; B32B 2307/7242
See application file for complete search history.

(56) References Cited

U.S. PATENT DOCUMENTS 4,105,818 A  8/1978  Scholle
4,400,227 A  8/1983  Riemersma
(Continued)

FOREIGN PATENT DOCUMENTS

EP  2730393  5/2014

OTHER PUBLICATIONS

Lott, Joseph R. "Design, Synthesis and Incorporation of Functional Additives into Multilayered Polymer Films," Submitted in partial fulfillment of the requirements for the degree of Doctor of Philosophy to the Department of Macromolecular Science and Engineering Case Western Reserve University, May 2011 (241 pages).
(Continued)

*Primary Examiner* — Ellen S Hock
(74) *Attorney, Agent, or Firm* — Pauly, DeVries Smith & Deffner LLC

(57) ABSTRACT

Embodiments herein relate to multilayer films for food packaging including migratory active substances. In an embodiment, a multilayer packaging film is included with a first polymeric layer and a second polymeric layer, wherein the first polymeric layer directly contacts a first side of the second polymeric layer. The first polymeric layer can be directly bonded to the second polymeric layer via a welding process. The first polymeric layer and the second polymeric layer can each comprise the same thermoplastic polymer. Contact between the first polymeric layer and the second polymeric layer can be discontinuous defining a plurality of cavities between the first polymeric layer and the second polymeric layer. Other embodiments are also included herein.

10 Claims, 6 Drawing Sheets

(52) U.S. Cl.
CPC ....... *B32B 2274/00* (2013.01); *B32B 2307/71* (2013.01); *B32B 2307/7242* (2013.01); *B32B 2307/74* (2013.01); *B32B 2439/70* (2013.01)

(56) References Cited

U.S. PATENT DOCUMENTS

| | | | |
|---|---|---|---|
| 4,823,783 | A | 4/1989 | Willhite, Jr. et al. |
| 6,379,812 | B1 | 4/2002 | Hofmeister et al. |
| 6,525,123 | B1 | 2/2003 | Yang et al. |
| 8,623,481 | B2 | 1/2014 | Chau |
| 9,370,916 | B2 | 6/2016 | Schmitz et al. |
| 9,827,729 | B2 | 11/2017 | Robert et al. |
| 10,780,669 | B2 * | 9/2020 | Wilcoxen .............. B29C 66/234 |
| 2004/0234797 | A1 | 11/2004 | Schwark et al. |
| 2006/0291756 | A1 * | 12/2006 | Thomas ............. B65D 33/2525 |
| | | | 206/524.4 |
| 2010/0255231 | A1 | 10/2010 | Chau et al. |
| 2013/0209713 | A1 * | 8/2013 | Chau ....................... B29C 48/19 |
| | | | 428/35.2 |
| 2014/0066919 | A1 | 3/2014 | Azamian et al. |
| 2014/0106096 | A1 * | 4/2014 | Doutt ..................... B32B 27/18 |
| | | | 428/35.2 |
| 2019/0210337 | A1 | 7/2019 | Decortes et al. |
| 2020/0189246 | A1 | 6/2020 | Liu et al. |

OTHER PUBLICATIONS

Maul, Peter "Barrier Enhancement using Additives," Fillers, Pigments and Additives for Plastics in Packaging Applications. Pira International Conference Brussels, Belgium, Dec. 5-6, 2005 (11 pages).

Riedl, Jessica A. "Porcess optimization: Ultrasonic welding of coextruded polymer film," (2013) Iowa State University Graduate Theses and Dissertations. 13323 (93 pages).

"Non-Final Office Action," for U.S. Appl. No. 16/682,114 dated Mar. 9, 2021 (17 pages).

"Final Office Action," for U.S. Appl. No. 16/682,114 dated May 25, 2021 (17 pages).

"Response to Final Office Action," for U.S. Appl. No. 16/682,114 filed Sep. 24, 2021 (11 pages).

"Response to Non-Final Office Action," for U.S. Appl. No. 16/682,114 filed May 6, 2021 (13 pages).

"Non-Final Office Action," for U.S. Appl. No. 16/682,114 dated Mar. 28, 2022 (17 pages).

* cited by examiner

MULTILAYER PACKAGING MATERIALS WITH RELEASE OF MIGRATORY ACTIVE SUBSTANCES

This application claims the benefit of U.S. Provisional Application No. 62/760,358, filed Nov. 13, 2018, the content of which is herein incorporated by reference in its entirety.

FIELD

Embodiments herein relate to multilayer films for food packaging including migratory active substances.

BACKGROUND

Many food packaging film materials are of multilayer design. A typical five-layer structured multifilm includes an inner layer of polyamide (PA) between two tie layers adhering two outer skin layers of polypropylene (PP) to either side of the inner layer. The outer skin layers can provide strength and toughness characteristics to the overall structure and protection to the inner layers. The inner layer can also provide strength and toughness characteristics and additionally, other important physical and chemical characteristics, such as barrier performance against permeation of oxygen and moisture.

In order to bond these layers of chemically dissimilar materials together, special adhesive layers or tie layers are needed. Common tie layer materials include ethylene vinyl acetate (EVA), ethylene methyl acrylate (EMA), ethylene acrylic acid (EAA), ethylene methacrylic acid (EMAA), and maleic anhydride grafted polyethylene (MAH-g-PE), amongst others.

Certain substances (gas, liquid, or solid) can be used to provide desirable organoleptic properties or other beneficial properties to packaged food products.

SUMMARY

Embodiments herein relate to multilayer films for food packaging including migratory active substances. In an embodiment, a multilayer packaging film is included with a first polymeric layer and a second polymeric layer, wherein the first polymeric layer directly contacts a first side of the second polymeric layer. The first polymeric layer can be directly bonded to the second polymeric layer via a welding process. The first polymeric layer and the second polymeric layer can each comprise the same thermoplastic polymer. Contact between the first polymeric layer and the second polymeric layer can be discontinuous defining a plurality of cavities between the first polymeric layer and the second polymeric layer.

In an embodiment, a method of manufacturing a multilayer packaging film is included. The method can include welding the first polymeric layer, the second polymeric layer, and the third polymeric layer directly together, wherein contact between the first polymeric layer and the second polymeric layer is discontinuous defining a plurality of cavities between the first polymeric layer and the second polymeric layer. The first layer and the third layer can directly contact opposite sides of the second layer. The first layer and the third layer can be directly bonded to the second layer via a welding process. The first polymeric layer, the second polymeric layer, and the third polymeric layer can each comprise the same thermoplastic polymer.

In an embodiment, a packaged food product is included herein. The package food product can include a package formed of a multilayer packaging film. The multilayer packaging film can include a first polymeric layer, a second polymeric layer, and a third polymeric layer. The first layer and the third layer can directly contact opposite sides of the second layer. The first layer and the third layer can be directly bonded to the second layer via a welding process. The first polymeric layer, the second polymeric layer, and the third polymeric layer can each comprise the same thermoplastic polymer. Contact between the first polymeric layer and the second polymeric layer can be discontinuous defining a plurality of cavities between the first polymeric layer and the second polymeric layer. The packaged food product can further include a food material disposed in the package.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Certain substances (gas, liquid, or solid) can be used to provide desirable organoleptic properties or other beneficial properties to packaged food products.

Some types of packaging materials can include an active substance coating the package. In these packages, the active substance needs to be formulated specifically to be able to stay on the package (i.e. having specific characteristics to remain adhered to the substrate). The coating is also exposed and therefore a significant portion of the active substance may be lost before it can add to the sensory experiences of an end consumer. Additionally, the release rate of active substances coated on a package might not be well-controlled, resulting in the premature depletion of the active substance.

Various embodiments disclosed herein include active packaging that can release, under certain circumstances, active substances into the interior volume of the package, into the surrounding environment external to the package, or into both. The active substances herein can migrate through a layer of a packaging film and provide various properties. In some embodiments, the active substances can include certain scented or flavored substances that are released into the area around the packaged food material or into the environment surrounding the package to positively affect the end consumer's sensory experiences with the product. In some embodiments, the package can contain certain antimicrobial compounds that once released into the package can eliminate, reduce, or suppress the growth of spoilage microorganisms. Other types of active substances are also contemplated herein.

Figure 1:
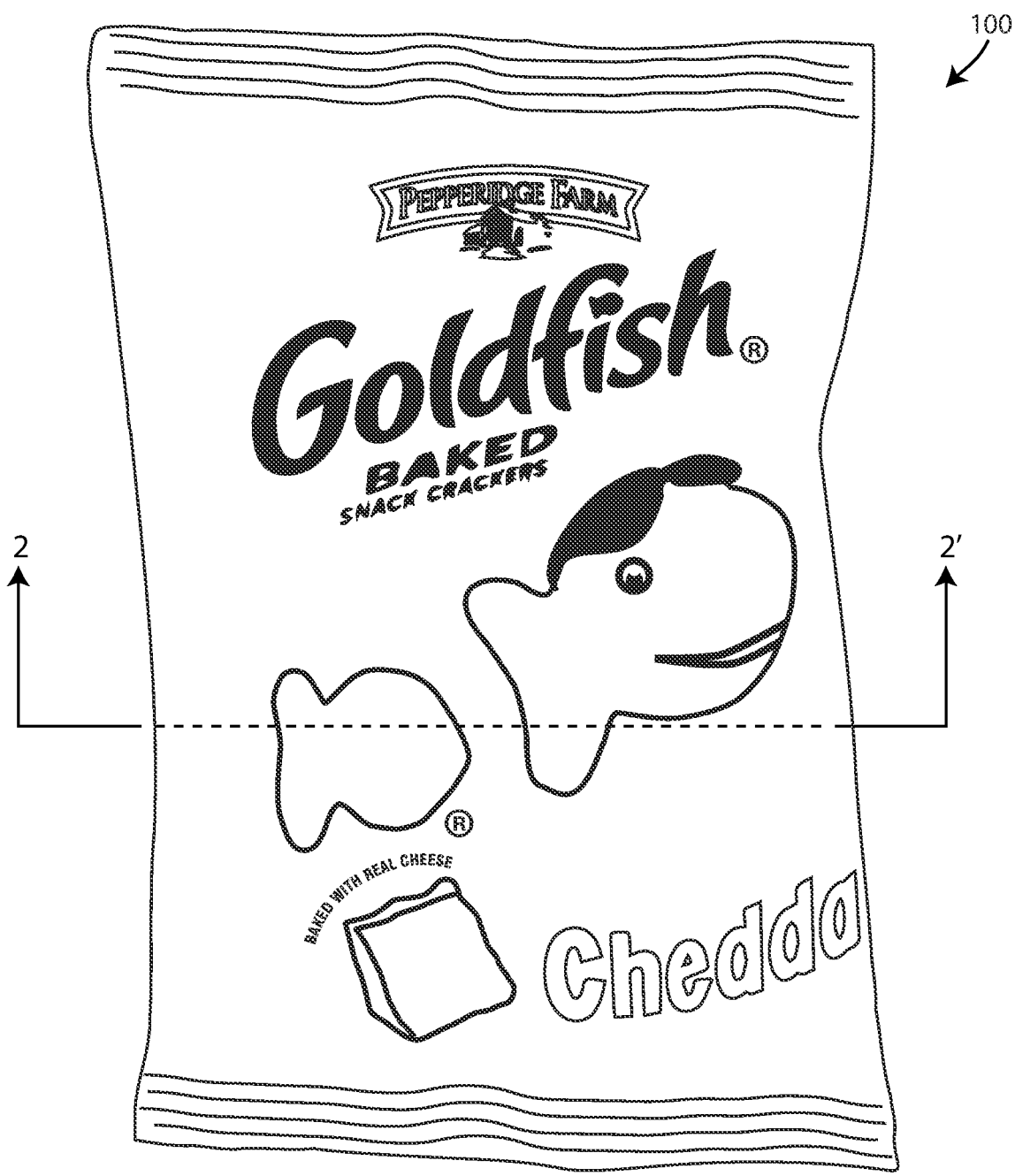
FIG. 1 is a front view of a packaged food product in accordance with various embodiments herein.

Referring now to FIG. 1, a front view of a packaged food product 100 is shown in accordance with various embodiments herein. The packaged food product 100 can include a multilayer packaging film defining an interior volume. A food material can be disposed within the interior volume.

Figure 2:
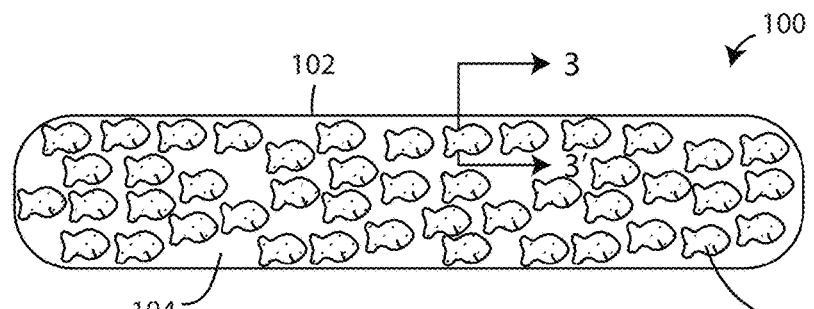
FIG. 2 is a schematic cross-sectional view of a packaged food product in accordance with various embodiments herein.

FIG. 2 shows a cross-sectional view of the packaged food product 100 shown in FIG. 1 along line 2-2 in accordance with various embodiments herein. The packaged food product 100 can include a multilayer packaging film 102 defining an interior volume 104. The food material 106 can be disposed within the interior volume 104.

Figure 3:
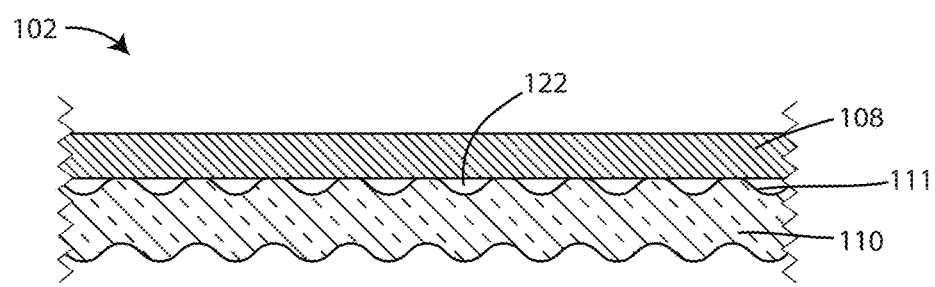
FIG. 3 is a schematic cross-sectional view of a multilayer film of a package in accordance with various embodiments herein.

In reference now to FIG. 3, a cross-sectional view of the multilayer packaging film 102 of a package is shown in accordance with various embodiments herein. The multilayer packaging film 102 can include a first polymeric layer 108 and a second polymeric layer 110.

The first polymeric layer 108 can directly contact a first side 111 of the second polymeric layer 110. The first polymeric layer 108 can be directly bonded to the second polymeric layer 110, such as through a welding process.

In various embodiments, the contact between the first polymeric layer 108 and the second polymeric layer 110 can be discontinuous. The discontinuous contact can define a plurality of cavities 122 between the first polymeric layer 108 and the second polymeric layer 110. In some embodiments, the one or more of the cavities 122 can be filled with a fluid, such as a liquid, a gas, a solid, or a combination thereof. In some embodiments, the one or more of the cavities 122 can be filled with an active substance or active substance composition.

In some embodiments, the first polymeric layer 108 can be disposed on the inside surface of the package, such as the surface the defines the interior volume 104 and can contact the food material 106. In other embodiments, the first polymeric layer 108 can be disposed on the outside surface of the package.

In some embodiments, the first polymeric layer 108 can be permeable to the active substance disposed in the cavities 122 and the second polymeric layer 110 can be substantially impermeable (or less permeable) to the substance. In some embodiments, the first polymeric layer 108 can be substantially impermeable (or less permeable) to the substance disposed in the cavities 122 and the second polymeric layer 110 can be permeable to the substance.

In some embodiments, the first polymeric layer 108, the second polymeric layer 110, and/or another polymeric layer can include a functional additive. In some embodiments, the amount of the functional additive in the second polymeric layer 110 can be different that the first polymeric layer 108 or any other polymeric layers. In various embodiments, the multilayer packaging film 102 exhibits an enhanced functional property, including one or more of strength, toughness, impact resistance, fracture resistance, and conductivity compared with an otherwise identical multilayer packaging film lacking the functional additives.

In some embodiments, the multilayer packaging film 102 exhibits an oxygen transmission rate (OTR) of less than 100 cc/100 in$^2$-day at 73° F., 0% RH, and 1 Atm as measured per ASTM D3985. In some embodiments, the multilayer packaging film 102 exhibits an OTR of less than 10 cc/100 in$^2$-day at 73° F., 0% RH, and 1 Atm as measured per ASTM D3985. In other embodiments, the multilayer packaging film 102 exhibits an OTR of less than 1 cc/100 in$^2$-day at 73° F., 0% RH, and 1 Atm as measured per ASTM D3985. In other embodiments, the multilayer packaging film 102 exhibits an OTR of less than 0.001 cc/100 in$^2$-day at 73° F., 0% RH, and 1 Atm as measured per ASTM D3985, for a period of at least one week of exposure. In some embodiments, the multilayer packaging film 102 exhibits an OTR falling within a range between any of the foregoing.

In some embodiments, the multilayer packaging film 102 exhibits a water vapor transmission rate (WVTR) of less than 10 cc/100 in$^2$/day at 100° F., 90% RH as measured per ASTM F1249. In other embodiments, the multilayer packaging film 102 exhibits a WVTR of less than 1 cc/100 in$^2$/day at 100° F., 90% RH as measured per ASTM F1249. In other embodiments, the multilayer packaging film 102 exhibits a WVTR of less than 0.1 cc/100 in$^2$/day at 100° F., 90% RH as measured per ASTM F1249. In some embodiments, the multilayer packaging film 102 exhibits a WVTR falling within a range between any of the foregoing.

The first polymeric layer 108 and the second polymeric layer 110 can be directly bonded, such as via a welding process. Similarly, the third polymeric layer 112 and the second polymeric layer 110 can be directly bonded as well. The layers can be directly bonded, such that there is not an intervening layer, a tie layer, adhesives or any other bonding components disposed between the layers. In various embodiments, the multilayer packaging film 102 is uncoated, such that the outer layers are uncovered or exposed to the surrounding environment. However, in other embodiments, the multilayer packaging film 102 (or discrete components thereof) may be coated, such that one or more exterior surfaces of the outer layers are covered with another material, such as a high gloss or matte overprint varnish, or the like.

In some embodiments, the multilayer packaging film 102 can include graphic components. The graphic components can be disposed on, in, or under the first polymeric layer 108. In some embodiments, the graphic components are between the first polymeric layer 108 and the second polymeric layer 110. For example, the graphic components can be reverse printed (or subsurface printed), such that the ink is covered by the first polymeric layer 108 for scuff resistance. When disposed between the first polymeric layer 108 and the second polymeric layer 110, the graphic components do not interfere with ultrasonic welding of the first polymeric layer 108 and the second polymeric layer 110. In some cases, the graphic components could also be disposed to the outside of the first polymeric layer 108 or even within the first polymeric layer 108 or another layer herein. The graphic components 126 can include designs, information, or other aspect that are to be relayed visually. The graphic components 126 can include inks, pigments, binders, and the like.

Figure 4:
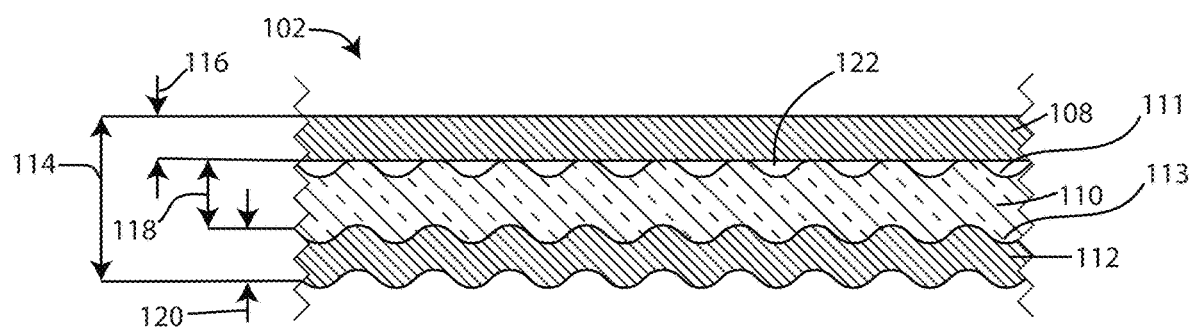
FIG. 4 is a schematic cross-sectional view of a multilayer film of a package in accordance with various embodiments herein.

In some embodiments, the multilayer packaging film 102 can include a third polymeric layer 112, such as shown in FIG. 4. FIG. 4 shows a cross-sectional view of multilayer packaging film 102 in accordance with various embodiments herein. The third polymeric layer 112 can directly contact a second side 113 of the second polymeric layer 110. The second side 113 can be disposed on an opposite side of the second polymeric layer 110 from the first side 111. In some embodiments, the contact between the second polymeric layer 110 and the third polymeric layer 112 can be continuous. In some embodiments, the third polymeric layer 112 can be directly bonded to the second polymeric layer 110, such as via a welding process. In various embodiments, the third polymeric layer 112 can include the same thermoplastic polymer as the first polymeric layer 108 and the second polymeric layer 110.

In some embodiments, the thickness 114 of the multilayer packaging film 102 is at least about 20 microns and not more than about 200 microns. In some embodiments, the thickness 116 of the first polymeric layer 108 is not less than about 10 microns and not more than about 50 microns. In some embodiments, the thickness 118 of the second polymeric layer 110 is not less than about 10 microns and not more than 150 microns. In some embodiments, the thickness 120 of the third polymeric layer 112 is not less than about 10 microns and not more than 50 microns. In some embodiments, the thickness of the first polymeric layer 108, the second polymeric layer 110, or the third polymeric layer each can be at least 5 microns, 6 microns, 7 microns, 8 microns, 9 microns, 10 microns, or 15 microns. In some embodiments, the thickness of the first polymeric layer 108, the second polymeric layer 110, or the third polymeric layer can be less than 200 microns, 175 microns, 150 microns, 125 microns, 100 microns, 75 microns, 70 microns, 65 microns, 60 microns, 55 microns, or 50 microns. In various embodiments, the thickness of the first polymeric layer 108, the second polymeric layer 110, and the third polymeric layer 112 can fall within a range wherein any of the foregoing thicknesses can serve as the upper or lower bound of the range.

In some embodiments, the thickness 116 of the first polymeric layer 108 is equivalent to the thickness 120 of the third polymeric layer 112. In some embodiments, the thickness 116 of the first polymeric layer 108 is equivalent to the thickness 118 of the second polymeric layer 110. In some embodiments, the thickness 118 of the second polymeric layer 110 is equivalent to the thickness 120 of the third polymeric layer 112.

In some embodiments, the multilayer packaging film 102 is asymmetric in layer thickness, such that at least two of the layers have different thicknesses. In other embodiments, three layers have different thicknesses. In other embodiments, all of the layers have different thicknesses.

In some embodiments, the thickness 116 of the first polymeric layer 108 is less than the thickness 118 of the second polymeric layer 110 and/or the thickness 120 of the third polymeric layer 112. In some embodiments, the thickness 118 of the second polymeric layer 110 is less than the thickness 116 of the first polymeric layer 108 and/or the thickness 120 of the third polymeric layer 112. In some embodiments, the thickness 120 of the third polymeric layer 112 is less than the thickness 116 of the first polymeric layer 108 and/or the thickness 120 of the second polymeric layer 110.

In some embodiments, the thickness 116 of the first polymeric layer 108 can different than the thickness 118 of the second polymeric layer 110 by at least 50%, 75%, 100%, 125%, 150%, 175%, 200%, 225%, or 250%.

Figure 5:
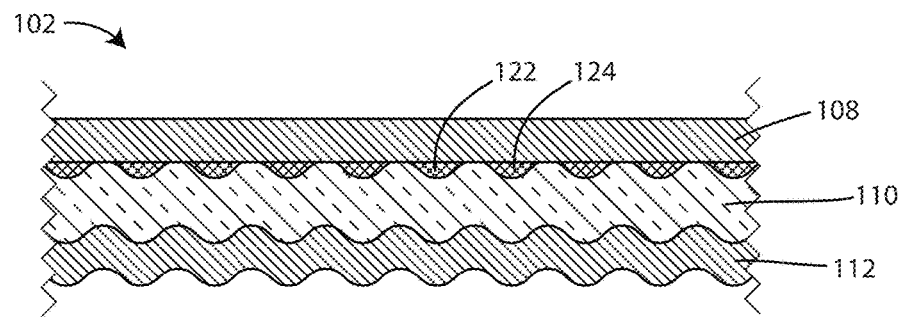
FIG. 5 is a schematic cross-sectional view of a multilayer film of a package in accordance with various embodiments herein.

FIG. 5 shows a cross-sectional view of multilayer packaging film 102 in accordance with various embodiments herein. The cavities 122 between the first polymeric layer 108 and the second polymeric layer 110 can be filled, at least partially, with a migratory active substance composition 124. In some embodiments, the cavities 122 can have an average volume of at least about 0.01 mL, 0.02 mL, 0.03 mL, 0.04 mL, 0.05 mL, 0.075 mL, 0.1 mL, 0.25 mL, 0.5 mL, 0.75 mL, or 1 mL. In some embodiments, the cavities 122 can have an average volume of no more than about 5 mL, 4 mL, 3 mL, 2 mL, 1 mL, 0.75 mL, or 0.5 mL. In some embodiments, the cavities 122 have an average volume falling within a range between any of the foregoing.

The migratory active substance composition 124 can include a liquid, a gas, or a combination of liquid and gas. In some embodiments, the cavities 122 between the first polymeric layer 108 and the second polymeric layer 110 can be filled with an aqueous composition. In some embodiments, the fluid can include a migratory active substance.

While FIGS. 4 and 5 show a multilayer packaging film with only three layers it will be appreciated that embodiments herein are not so limited. By way of example, embodiments of multilayer packaging films herein can include 2, 3, 4, 5, 6, 7, 8, 9, 10, 11, 12 or more distinct material layers, or can include a number of layers falling within a range between any of the foregoing.

Figure 6:
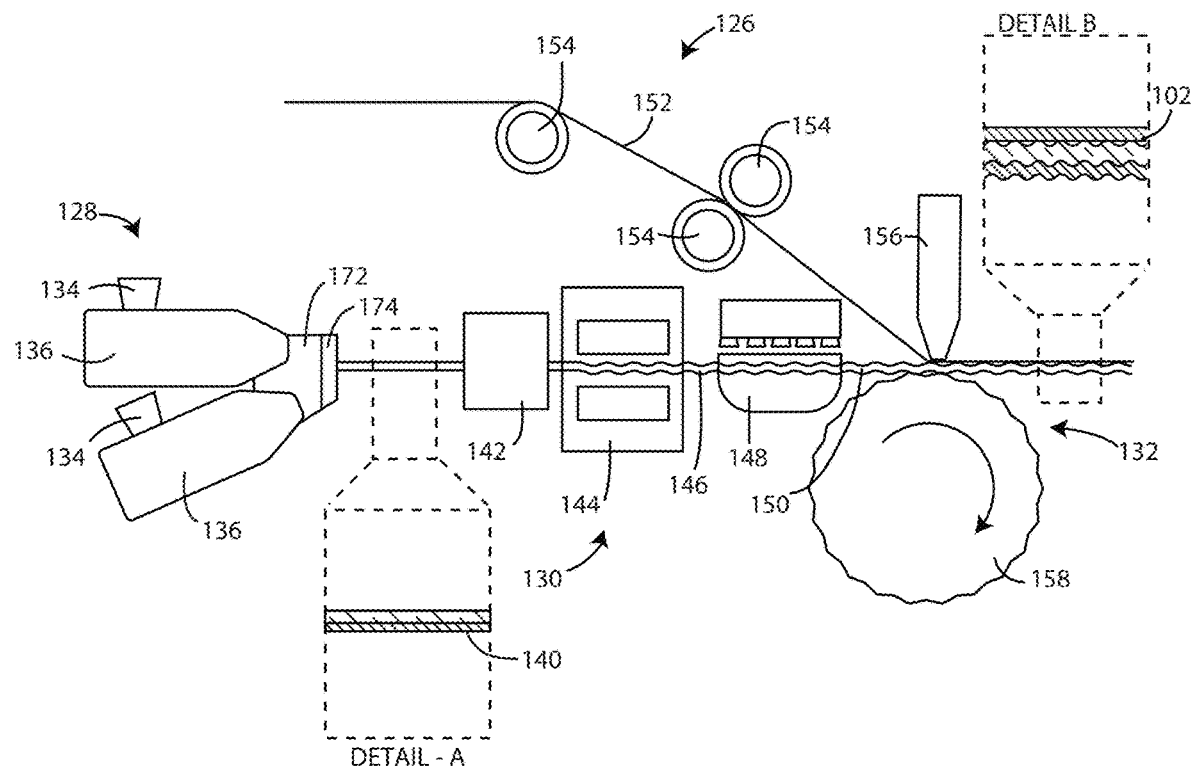
FIG. 6 is a schematic view of a manufacturing system in accordance with various embodiments herein.

Referring now to FIG. 6, a schematic of a manufacturing system 126 is shown in accordance with various embodiments herein. The manufacturing system 126 can be configured to manufacture or create the multilayer film. The manufacturing system 126 can include an extrusion portion 128, a cavity forming and filling portion 130 and a welding portion 132. The manufacturing system 126 can extrude one or more layers of the multilayer film and bond the layers together, such as by ultrasonically welding the layers together.

The manufacturing system 126 can include extruders 136. In some embodiments, an extruder 136 can be included for each discrete layer of coextruded material. Each extruder 136 can include one or more material input hoppers 134 for raw material inputs. The melt streams from the extruders 136 can feed into a feed block 172 and then extruded materials can pass out through a die 174.

In some embodiments, multiple layers of the film can be coextruded, such that they are extruded simultaneously from the extruders 136. In some embodiments, at least two layers of the multilayer film are coextruded. In some embodiments, the extruders 136 can coextrude a two-layer film 140 or a portion of the multilayer packaging film, such as shown in the detailed view A.

Many different types of extruders can be used in embodiments herein including, but not limited to, single-screw extruders, twin-screw extruders, and the like.

In the example shown in FIG. 6, the two layers 140 of the multilayer film can pass through a pretreatment mechanism 142. The pretreatment mechanism 142 can prepare the two layers 140 for the cavities being formed. In some embodiments, the pretreatment mechanism 142 can provide a heat treatment or a chemical treatment to the two layers 140 to soften or otherwise prepare the two layers 140 to have the cavities formed into the two layers 140. In some embodiments, the pretreatment mechanism 142 can be omitted.

The manufacturing system 126 can include a thermoformer 144. The thermoformer 144 can form the flat or planar two-layer film 140 into a two-layer film 146 with cavities, indentations, or recesses to be filled with a migratory active substance composition. The cavities, indentations, or recesses in the two-layer film 146 can be capped or enclosed with an additional polymeric layer 152. In some embodiments, the thermoformer 144 can include forming plates that include bumps or ridges to form the cavities. The thermoformer 144 can be configured to press the two-layer film 140 to form the cavities. In other embodiments, the thermoformer 144 can include a rotary die configured to form the cavities. In some embodiments, the thermoformer 144 can be vacuum assisted, such as having vacuum outlet holes to retain the layers against the thermoformer 144.

The manufacturing system 126 can further include a filling mechanism 148. The filling mechanism 148 can be configured to fill the cavities with a migratory active substance composition, such as an activated compound as described herein. In some embodiments, the filling mechanism 148 can include a spray station, where the cavities in the two-layer film 146 can be filled with a fluid by spraying the fluid into the cavities. In some embodiments, the filling mechanism 148 can include an immersion bath or tank, where the cavities in the two-layer film 146 can be filled with a fluid by immersing the two-layer film 146 into the fluid. In some embodiments, the filling mechanism 148 can include a fog chamber to fill the cavities with a fluid.

In some embodiments, at least one polymeric layer 152 (which can be a monolayer, a bilayer, a multilayer, etc.), such as the first polymeric layer, can be separately placed onto the other two layers after the other two layers are coextruded, formed, and filled with a fluid. In some embodiments, the first layer can be added to the second and third layers, when the second and third layers are coextruded without the first layer. In some embodiments, the added layer(s) 152 can be extruded at a different location, such as at a different location within the same manufacturing facility or at a different manufacturing facility and transported to the facility with the manufacturing system 126. In some embodiments, the polymeric layer 152 can be further treated or printed (including surface printed on a top surface or reverse printed on a bottom surface) before it is placed (stacked) onto the other layers.

The added polymeric layer 152 can be fed onto the two-layer film 146, such as with a feed system including one or more rollers 154. The layers 146, 154 (both the coextruded two-layer film 146 and the added layer(s) 154) can be bonded together via an ultrasonic welding process. The polymeric layers 146, 154 can be fed between an anvil roller 158 and a sonotrode 156 or ultrasonic horn. The sonotrode 156 can be configured to create ultrasonic vibrations and apply the vibrations to the layers, thereby bonding the layers together through a welding mechanism. After passing through the anvil roller 158 and the sonotrode 156, the multilayer packaging film 102 can include three bonded layers with filled cavities, such as shown in the detailed view B.

Figure 7:
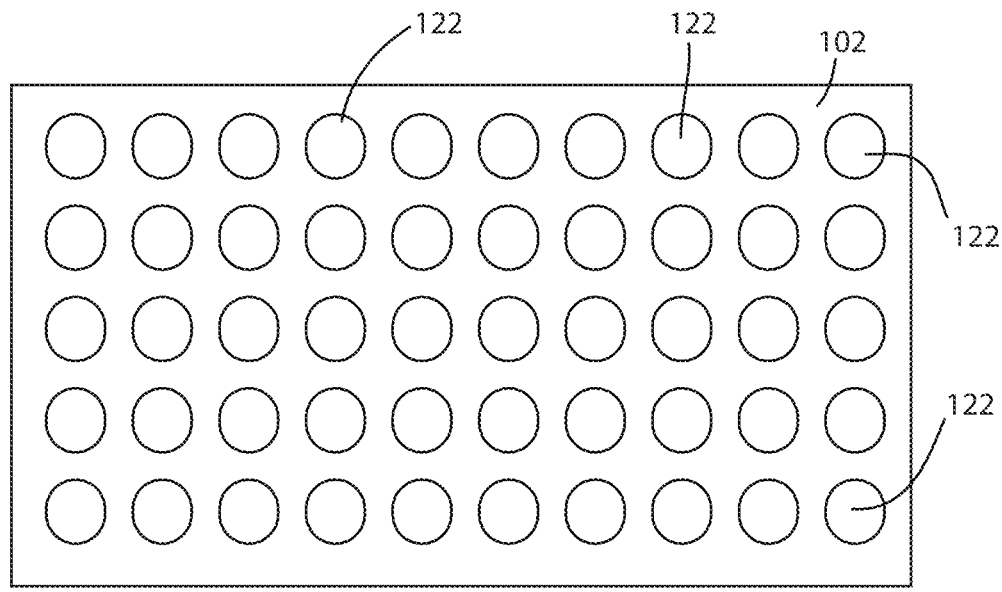
FIG. 7 is a schematic top view of a multilayer film in accordance with various embodiments herein.

In reference now to FIG. 7, a top view of a multilayer film is shown in accordance with various embodiments herein. In some embodiments, the cavities 122 have a circular shape when viewed from the top. In some embodiments, the cavities 122 can have an ovoid shape, an oval shape, or another rounded shape. In various embodiments, the cavities 122 can form a pattern, such as grid. In some embodiments, the cavities 122 can form lines, columns, or rows.

Figure 8:
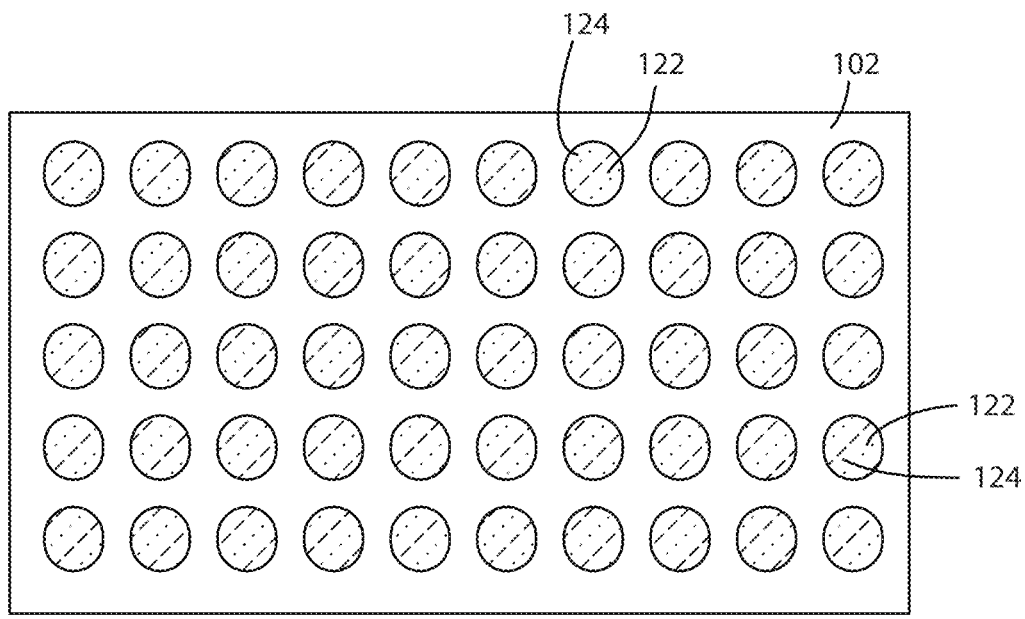
FIG. 8 is a schematic top view of a multilayer film in accordance with various embodiments herein.

FIG. 7 can also represent the two-layer film 146 prior to the cavities 122 being filled with a fluid. FIG. 8 shows the cavities 122 filled with the fluid 124. In some embodiments, at least 10%, 20%, 25%, 50%, 75%, 80%, 90%, 95%, 97%, 98%, or 99% of the volume of the cavities can be filled with the fluid 124.

Figure 9:
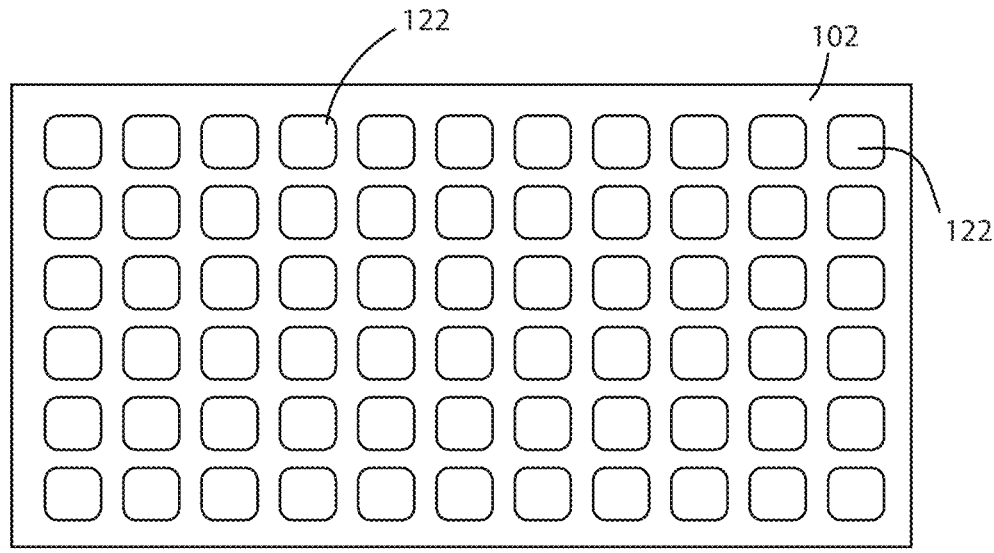
FIG. 9 is a schematic top view of a multilayer film in accordance with various embodiments herein.

In some embodiments, the cavities 122 can have a polygonal shape, such as shown in FIG. 9. In some embodiments, the polygonal shape can include a triangle, a square, a rectangle, a pentagon, a hexagon, a heptagon, or an octagon. In some embodiments, the polygonal shape can be a regular polygon. In some embodiments, the cavities 122 can have a shape that include at least one straight portion and one curved portion.

Figure 10:
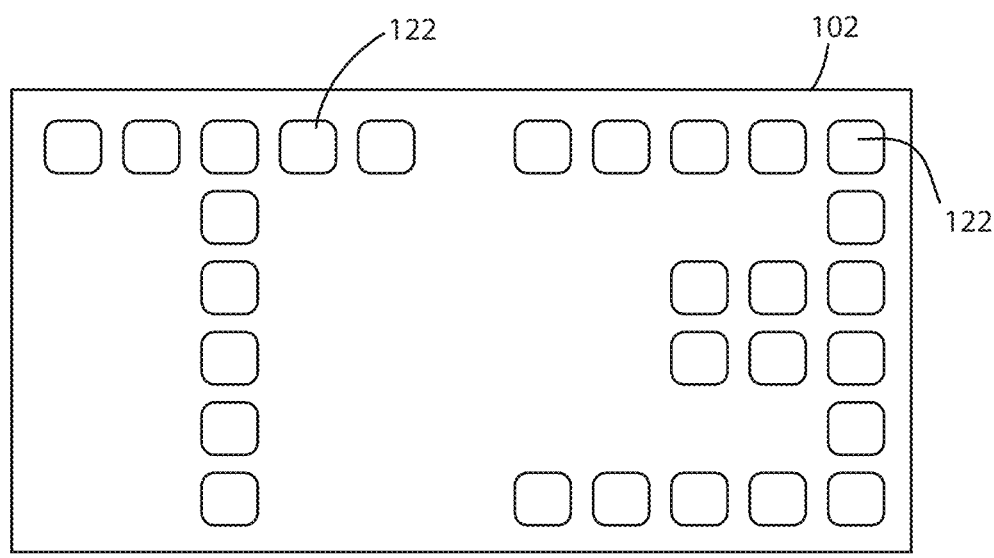
FIG. 10 is a schematic top view of a multilayer film in accordance with various embodiments herein.

FIG. 10 shows a top view of a multilayer packaging film 102 in accordance with various embodiments herein. In some embodiments, the cavities 122 can form a character pattern, such as shown in FIG. 10. In some embodiments, the cavities 122 form a letter, a number, or a graphic.

Methods

Figure 11:
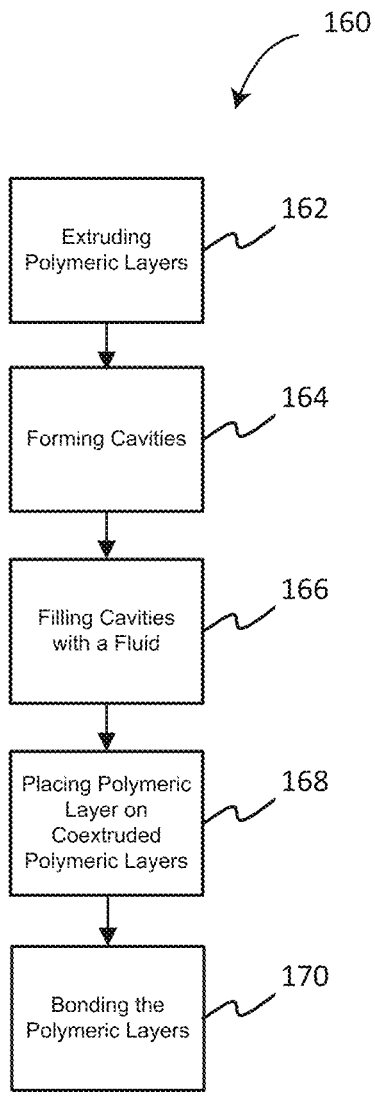
FIG. 11 is a flow chart of a method in accordance with various embodiments herein.

Referring now to FIG. 11, a flow chart of a method 160 of manufacturing a packaging film is shown in accordance with various embodiments herein. The method 160 can include coextruding at least two layers of a multilayer packaging film 162. In some embodiments, the method 160 can include coextruding at least three layers, at least four layers, at least five layers, at least six layers, at least seven layers, at least eight layers, or at least nine layers. The multilayer packaging film can be as describe herein. The multilayer packaging film can include a first polymeric layer, a second polymeric layer, and a third polymeric layer.

The method 160 can further include forming a plurality of cavities in the extruded packaging film 164. In some embodiments, the forming of cavities can include a thermoformer. In some embodiments, the forming of cavities can include a pressing step, such as compressing the extruded film between two plates, or a continuous forming of the film, such as with a rotary die. The method 160 can include filling the plurality of cavities with a fluid 166. As described herein the filling of the cavities can include spraying or submerging the extruded film.

In some embodiments, the method 160 can further include placing additional layers (monolayers, bilayers, multilayers, etc.) on to the two or more layers that were coextruded 168. For example, in some embodiments, the second polymeric layer and the third polymeric layer can be coextruded, and the first polymeric layer can be placed onto the other two layers after they have been coextruded.

The method 160 can further include welding multiple layers together 170. In some embodiments, the welding can include ultrasonic welding. In some embodiments, the first polymeric layer, the second polymeric layer, and the third polymeric layer are welded directly together. Additional layers can also be welded simultaneously with the first three layers. In various embodiments, contact between the first polymeric layer and the second polymeric layer can be discontinuous defining a plurality of cavities between the two layers.

In some embodiments, the method can also include a step of reverse printing or otherwise depositing graphic components onto a layer, which can happen before the operation of welding the multiple layers together 170.

Migratory Active Substance Compositions

As mentioned above, the cavities can be filled with a migratory active substance composition (gas, liquid or solid) that can include one or more substances that migrate through one or more layers of the multilayer film and are eventually released from a surface to cause a desired effect. A migratory active substance can migrate, diffuse or disperse away from the cavity, such as through one or more polymeric layers of films described herein. The active substance compositions can provide certain properties, such that the environment around the package can be changed, the product within the package can be changed, or the environment within the package can be changed. By way of example, in some embodiments, an active substance can result in one or more volatile organic compounds (VOCs) being released into a space within a food package or to the environment surrounding the food package or both.

In some embodiments, the active substance composition can include one or more compounds that create or impact organoleptic properties of a packaged food product. For example, in some embodiments, the active substance composition can include one or more compounds (odorants, aroma compounds, or fragrance compounds) that have a scent (give off an odor) and is sufficiently volatile to be transported to the olfactory system to be sensed by a product consumer. In some embodiments, the active substance composition can include one or more compounds that create or impact a flavor sensed by a product consumer. Exemplary active substance compositions herein can include organic compounds including both aromatic and aliphatic compounds. In some embodiments, the active substance composition can include one or more organic compounds with molecular weights of 300 Da or less. Organic compounds that can provide or impact organoleptic properties herein can include, but are not limited, to esters, terpenes, aldehydes, alcohols, ketones, lactones, thiols, and the like. Specific organic compounds can include, but are not limited to, geranyl acetate, methyl propionate, methyl butyrate, ethyl butyrate, isoamyl acetate, pentyl butyrate, pentyl pentanoate, octyl acetate, benzyl acetate, methyl anthranilate, geraniol, nerol, citral, citronellal, citronellol, limonene, vanillin, anisole, and the like.

In some embodiments, the cavities between the first polymeric layer and the second polymeric layer can be filled with an active substance composition that has antimicrobial properties. In some embodiments, such active substance compositions can include compounds that migrate into the package thereby eliminating, reducing, or suppressing the growth of spoilage microorganisms.

In some embodiments, the active substance composition can also include a carrier compound which, in some embodiments, can form an azeotrope or similar complex with an active substance compound and can allow the active substance compound to migrate more quickly through one or more of the polymeric layers of the film. In some embodiments, the carrier compound can aid in volatilization of the active substance composition.

In various embodiments herein, the multilayer films herein can exhibit an asymmetric release (such as more released to one side than the other) of an active substance composition or component thereof. Asymmetry of release can be achieved through various mechanisms described herein including layer(s) that serve as barriers to migration of certain compounds, layer(s) that promote migration of certain compounds, variations in thickness of layer(s), variations in the identity and amount of functional additives in various layers of the multilayer film, etc. In some embodiments, the amount of an active substance composition or a component thereof that can release from a first side of a multilayer film over a 14 day period can be at least 10, 20, 30, 40, 50, 75, 100, 125, 150, 175, 200, 225, 250, 300, 400, 500, 600, 800, or 1000 percent more (or an amount falling within a range between any of the foregoing) than the amount of the same active substance composition or a component that releases from a second side of the multilayer film.

In some embodiments, the cavities between the first polymeric layer and the second polymeric layer can be filled with a gas. In some embodiments, the cavities between the first polymeric layer and the second polymeric layer can be filled with an inert gas, such as nitrogen, or simply a mixture of gases found in ambient air.

Layer Polymers

In various embodiments, each of the layers can include a polymer, such as a thermoplastic polymer. Polymers can include, but are not limited to, polyolefins, polyethylene terephthalate, polystyrene, polyvinyl chloride, polycarbonate, ABS, polyamides, polyphenylene sulfide, PMMA, and the like. In various embodiments, the thermoplastic polymer can include homopolymers or copolymers of high density polyethylene (HDPE), low density polyethylene (LDPE) (PE molecular weight of repeat unit 28.05 g/mol as one specific example), polypropylene (PP, molecular weight of repeat unit 42.08 g/mol as one specific example), polyethylene terephthalate (PET molecular weight of repeat unit 192.2 g/mol as one specific example), polystyrene (PS including high impact polystyrene (HIPS), PS molecular weight of repeat unit 104.1 g/mol as one specific example), polyvinyl chloride (PVC, molecular weight of repeat unit 62.5 g/mol as one specific example), polycarbonate (PC, molecular weight of repeat unit 290.315 g/mol as one specific example), acrylonitrile butadiene styrene (ABS, molecular weight of repeat unit 211.308 g/mol as one specific example), polyamide (PA, molecular weight of repeat unit 341.496 g/mol as one specific example), polyphenylene sulfide (PPS, molecular weight of repeat unit 108.16 g/mol as one specific example), poly(methyl methacrylate) (PMMA, molecular weight of repeat unit 100.12 g/mol as one specific example), and the like.

Each of the polymeric layers can include the same polymer. In various embodiments, the melt flow properties of the thermoplastic polymer in the second polymeric layer can be the same as the melt flow properties of the thermoplastic polymer in the first polymeric layer and/or the third polymeric layer. In some embodiments, the average molecular weight of the thermoplastic polymer in the second polymeric layer can be the same as the average molecular weight of the thermoplastic polymer in the first polymeric layer and the third polymeric layer. In some embodiments, the average molecular weight of the thermoplastic polymer in the second polymeric layer can be different than the average molecular weight of the thermoplastic polymer in the first polymeric layer and the third polymeric layer.

In some embodiments, the thermoplastic polymer in the second polymeric layer exhibits a process induced polymer chain orientation that can be different than a polymer chain orientation in the first polymeric layer and the third polymeric layer. In other embodiments, the thermoplastic polymer in the second polymeric layer exhibits a process-induced polymer chain orientation that can be the same as a polymer chain orientation in the first polymeric layer and the third polymeric layer.

Functional Additives

As mentioned above, one or more of the layers can include a functional additive. As used herein, the term "functional additive" shall refer to additives included with a polymeric composition in order to provide a functional property to a layer made with the polymeric composition. The term "functional additive" does not include normal processing aids known to those of skill in that art that are added to assist with the extrusion process. The functional additive can include one or more of the following a barrier additive, an oxygen scavenger, a desiccant, a clarifying agent, a nucleator, a pigment, a dye, a UV stabilizer, a UV blocker, an optical brightener, an impact modifier, a slip agent, an antiblock agent, a reinforcing additive, a plasticizer, an electrical conductivity enhancer, a thermal conductivity enhancer, and a permeability modifier. In some embodiments, the second polymeric layer can include a second functional additive. In some embodiments, the first polymeric layer, the third polymeric layer, and/or other layers can include a second functional additive.

In some embodiments, the oxygen scavenger can include an oxidizable polymer and a transition metal salt catalyst. In some embodiments, the oxygen scavenger can include poly(tetramethylene ether)-b-PET block copolymer (PTMEG-b-PET). In some embodiments, the oxygen scavenger can include m-xylylene diamine adipate with a cobalt salt catalyst. In some embodiments, the oxygen scavenger can include an oxidizable ethylene terpolymer such as ethylene methylacrylate cyclohexenylmethyl acrylate (EMCM), poly(ethylene/vinyl cyclohexene) (EVCH), poly(cyclohexene methyl methacrylate), (CHMA), and poly(cyclohexene methyl acrylate) (CHAA), with a cobalt salt catalyst.

In some embodiments, functional additives herein can include materials that affect how migratory active substance compositions can migrate through the polymeric layer or layers (as one example can alter permeability of a polymeric layer to migratory active substance compositions or components thereof). By way of example, in some embodiments, functional additives herein can include permeability modifying compounds that slow down or otherwise impede (or decrease permeability) migration of migratory active substance compositions or components thereof. In some embodiments, functional additives herein can include permeability modifying compounds that speed up or otherwise aid (increase permeability) in the migration of migratory active substance compositions or components thereof. As such, in some embodiments, the permeability of one or more polymeric layers herein can be tuned to create a desirable release profile for migratory active substance compositions or components thereof. Further, in some embodiments, a functional additive can be added to one layer to increase permeability and a functional additive can be added to another layer to decrease permeability. In this manner, functional additives herein can be used to control the direction of release (into the package, or outside the package) and release rate through controlling the migration/diffusion of the components through polymeric layers.

As merely one example, in a three-layer structure, the active substance composition loaded in the cavities is an antimicrobial agent. A functional additive, such as an exfoliated clay can be added to the outmost polymeric layer so that the diffusion of the active substance composition through that layer is greatly delayed (decreased permeability). Simultaneously, a functional additive such as a plasticizer or similar compound can be added to other polymeric layer(s) (such as an inner most layer or layers) so that the diffusion of the specific compound through the two layer is promoted (increased permeability). In such a scenario, the migratory active substance composition (of a component thereof) can preferentially release into the package rather than release to the outside of the package and where it may be wasted. As such, in some embodiments, the multilayer films herein can exhibit an asymmetric release (such as more released to one side than the other) of an active substance composition or component thereof.

Layer Compositions

One or more of the layers can include a weight percent amount of a functional additive. In some embodiments, the second layer can include a weight percent amount of a functional additive that is different than the first and third polymeric layers.

In some embodiments, the total loading of functional additives in the first polymeric layer, the second polymeric layer, or third polymeric layer can be greater than 0.1, 0.5, or 1 wt. % and less than 20, 15, 10, or 5 wt. %.

In some embodiments, the second polymeric layer can include a weight percent amount of a functional additive that is at least 50% greater than the first and third polymeric layers. In some embodiments, the second polymeric layer can include a weight percent amount of a functional additive that is at least 100% greater than the first and third polymeric layers. In some embodiments, the second polymeric layer can include a weight percent amount of a functional additive that is at least 200% greater than the first and third polymeric layers.

In some embodiments, the second polymeric layer can include at least about 0.01 wt. percent of the functional additive. In some embodiments, the second polymeric layer can include at least about 0.01 wt. percent of a functional additive and the first and third polymeric layers can include less than 0.01 wt. percent of the functional additive. In some embodiments, the second polymeric layer can include at least about 1.0 wt. percent of the functional additive. In some embodiments, the first and third polymeric layers comprise a least one functional additive in common with the second polymeric layer, but at a lower wt. % concentration.

In some embodiments, the first and third polymeric layers each can include a least one functional additive. The functional additive of the first polymeric layer and the functional additive the third polymeric layer can both be different than the functional additives in the second polymeric layer. In some embodiments, the functional additive of the first polymeric layer and the functional additive the third polymeric layer can be different from one another. In some embodiments, the first polymeric layer and the third polymeric layer lack the functional additive of the second polymer layer.

Extrusion

As described above, one or more of the layers can be extruded. In some embodiments, the layer is pushed through a die to obtain a consistent cross-section. In other embodiments, the layer can be pulled or drawn through the die.

In some embodiments, one or more layers can be coextruded, such that the one or more layers are extruded simultaneously. In various embodiments, the extrusion process can include sheet extrusion to result in an extruded layer that has a length and width which are each at least 10 times greater than the thickness of the layer.

The extrusion process can include loading one or more polymers, in the form of polymer pellets, flakes, powders, granules, or chips, and one or more other materials into one or more hoppers. The polymer can be pushed through the extruder via a feeding mechanism, such as a screw drive. The polymer composition can be melted such as through mechanical energy generated by a screw drive and/or with heaters arranged along the extrusion system. The molten polymer can be forced into and through a die, which can shape the polymer into the desired configured. In some embodiments, polymers and other materials to be extruded such as processing aids and/or functional additives can first be mixed together in a compounding extruder before final extrusion into a sheet form.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A packaged food product comprising:
a package formed of a multilayer packaging film, the multilayer packaging film comprising
a first polymeric layer;
a second polymeric layer; and
a third polymeric layer;
wherein a cross-section of the multilayer packaging film comprising a portion of the first polymeric layer, a portion of the second polymeric layer, and a portion of the third polymeric layer is structurally asymmetric;
wherein the first layer and the third layer directly contact opposite sides of the second layer;
wherein the first layer and the third layer are directly bonded to the second layer via a welding process;
wherein the first polymeric layer, the second polymeric layer, and the third polymeric layer each comprise the same thermoplastic polymer;
wherein contact between the first polymeric layer and the second polymeric layer is discontinuous defining a plurality of cavities between the first polymeric layer and the second polymeric layer; and
a food material disposed in the package; and
wherein the cavities between the first polymeric layer and the second polymeric layer are filled with a migratory active substance composition.

2. The packaged food product of claim 1, wherein the migratory substance composition comprises an organic compound, wherein the organic compound has a molecular weight of less than 300 Da with organoleptic properties.

3. The packaged food product of claim 1, wherein the film exhibits asymmetric release from exterior surfaces thereof of at least one component of the migratory substance composition.

4. The packaged food product of claim 1, wherein the migratory substance comprises one or more compounds selected from the group comprising an odorant, an aroma compound, or a fragrance compound.

5. The packaged food product of claim 1, wherein the migratory substance comprises one or more compounds selected from the group comprising an aromatic or aliphatic compound.

6. The packaged food product of claim 1, wherein the migratory substance comprises one or more organic compounds comprising esters, terpenes, aldehydes, alcohols, ketones, lactones, and thiols.

7. The packaged food product of claim 1, wherein the migratory substance comprises one or more organic compounds comprising geranyl acetate, methyl propionate, methyl butyrate, ethyl butyrate, isoamyl acetate, pentyl butyrate, pentyl pentanoate, octyl acetate, benzyl acetate, methyl anthranilate, geraniol, nerol, citral, citronellal, citronellol, limonene, vanillin, and anisole.

8. The packaged food product of claim 1, wherein the first layer and the third layer are directly bonded to the second layer via a welding process comprising an ultrasonic welding process.

9. The packaged food product of claim 1, wherein contact between the third polymeric layer and the second polymeric layer is continuous resulting in the structurally asymmetric cross-section.

10. The packaged food product of claim 1, wherein at least two of the first polymeric layer, the second polymeric layer and the third polymeric layer have different thickness resulting in the structurally asymmetric cross-section.

* * * * *